United States Patent [19]

Valdes

[11] Patent Number: 4,659,291

[45] Date of Patent: Apr. 21, 1987

[54] HYDROELECTRIC SWITCH FOR CONTROLLING ELECTRIC MOTOR DRIVEN PUMP

[76] Inventor: Osvaldo J. Valdes, Alameda BDO. O'Higgins 4463, Santiago, Chile

[21] Appl. No.: 638,367

[22] Filed: Aug. 7, 1984

Related U.S. Application Data

[63] Continuation-in-part of Ser. No. 506,781, Jun. 22, 1983, abandoned.

[51] Int. Cl.[4] ............................................ F04B 49/06
[52] U.S. Cl. .................................. 417/44; 137/211.5; 200/82 R
[58] Field of Search ................ 417/38, 44; 137/211.5; 200/82 R

[56] References Cited

U.S. PATENT DOCUMENTS

| | | | |
|---|---|---|---|
| 2,362,586 | 11/1944 | Ruth | 137/211.5 |
| 2,557,128 | 6/1951 | Magill | 200/82 R X |
| 2,709,964 | 6/1955 | Brady, Jr. | 417/44 X |
| 2,884,000 | 4/1959 | Witter | 137/211.5 |
| 2,899,900 | 8/1959 | Haskett | 417/44 |
| 2,911,916 | 11/1959 | Bliss | 417/44 X |
| 3,100,505 | 8/1963 | Johnson | 417/44 X |
| 3,171,351 | 3/1965 | Shetler | 137/211.5 |
| 3,259,067 | 7/1966 | Bryan | 137/211.5 |
| 3,269,318 | 8/1966 | Telford et al. | 137/211.5 |
| 3,318,324 | 5/1967 | Ruth | 137/211.5 |
| 3,385,216 | 5/1968 | Henderson | 417/38 X |
| 3,738,775 | 6/1973 | Strickland | 417/38 |
| 3,805,820 | 4/1974 | Brady, Jr. et al. | 137/211.5 |
| 3,973,877 | 8/1976 | Taki | 417/38 |
| 4,002,184 | 1/1977 | Tubbs et al. | 417/38 X |

FOREIGN PATENT DOCUMENTS 191485  11/1982  Japan ..................................... 417/38

Primary Examiner—Carlton R. Croyle
Assistant Examiner—Paul F. Neils
Attorney, Agent, or Firm—Stevens, Davis, Miller & Mosher

[57] ABSTRACT

A hydroelectric switch for a pump comprising in a first embodiment an elongated body defining fluid inlet and fluid outlet orifices, a substantially elongated seat through which fluid flows, a disk having a tapered flange and a rod extending centrally therefrom, the disk peripherally seating within the elongated seat, a conduit by-passing the disk, a spring-biased piston slidable within a cylinder built-in the body on the same axis as the rod, the piston slidable upon the rod when the spring expands, a conduit feeding the cylinder with fluid from the outlet orifice, an electrical switch attached to the body on the same axis as the rod and operable by the movement of the rod. In a second embodiment, a valve member is axially movable in an elongated body defining fluid inlet and fluid outlet orifices, the valve member as a disk in combination with a rod extending therefrom, the disk is sealably engagable with an inner bore of the elongated body and biased away from a sealing engagement with said body by a spring. Under a build-up of water pressure, the valve member is biased to the right against the pressure of the spring with the rod end contacting an electrical switch attached to the body on the same axis as the rod opening contacts therein. An enlarged compartment is provided with an air injection pump supplying a charge of air to the compartment each time the pump begins operation so as to maintain an air cushion for forcing water out of the compartment when desired.

4 Claims, 17 Drawing Figures

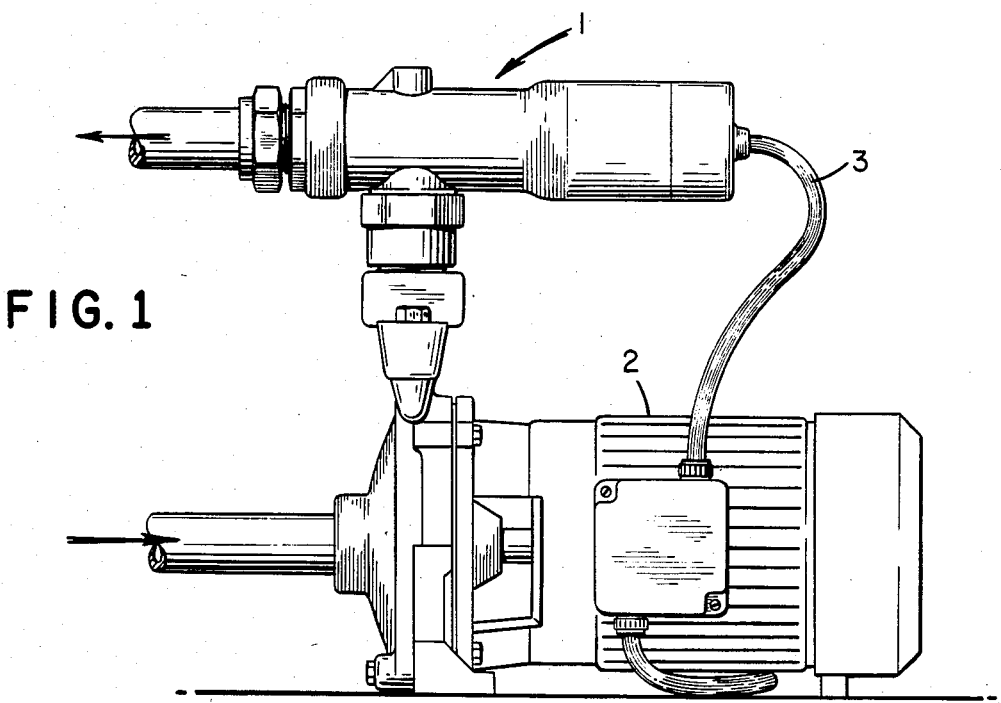
FIG. 1
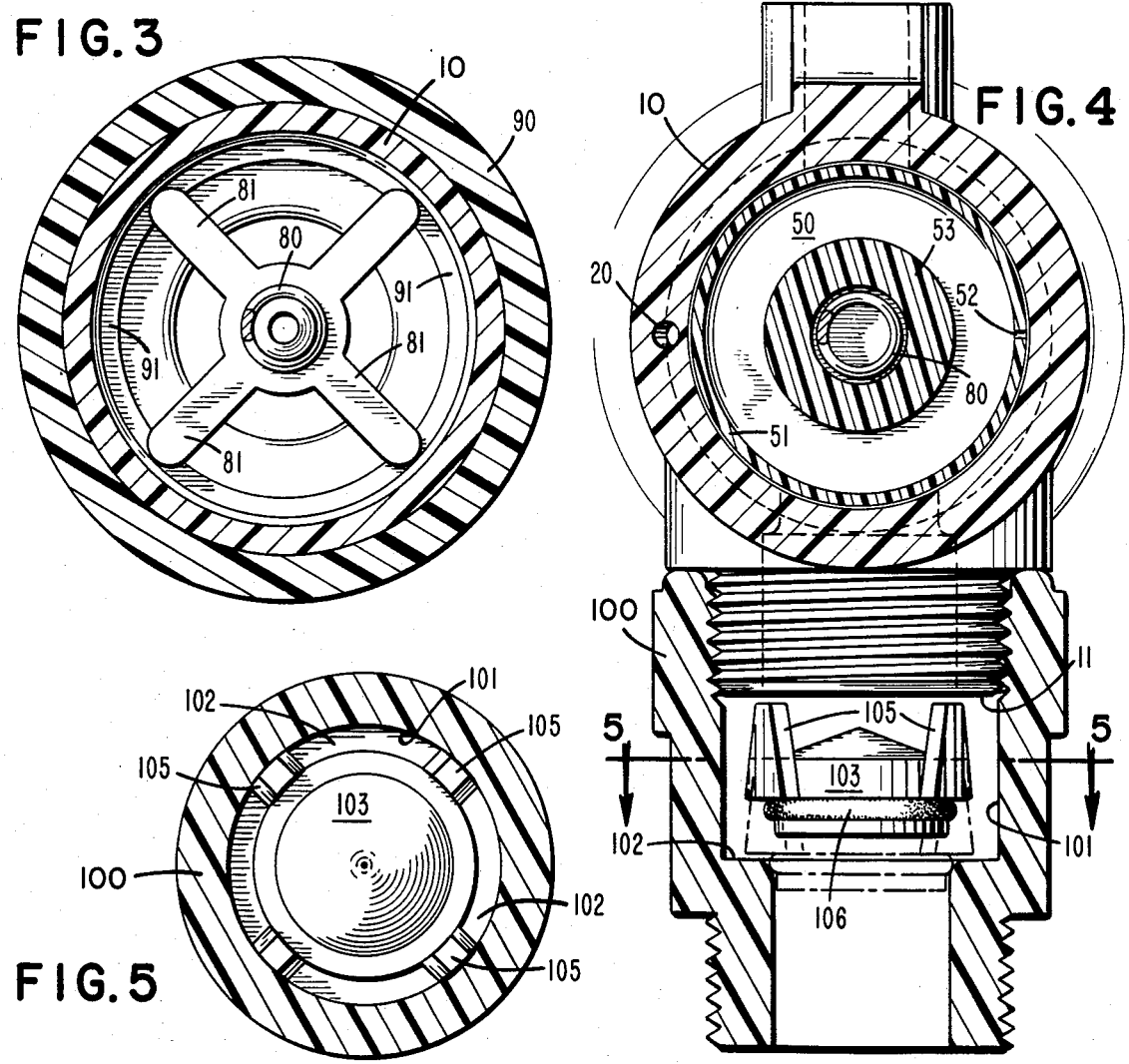
FIG. 3
FIG. 4
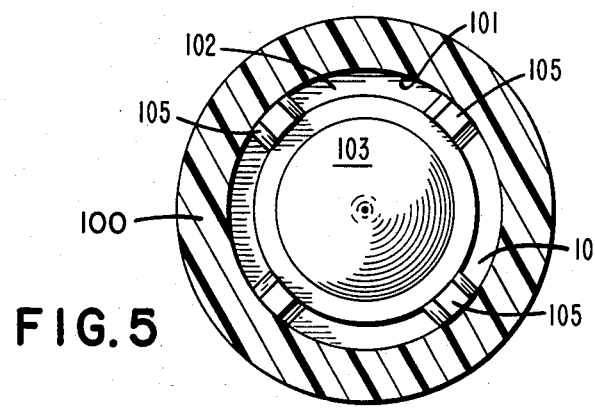
FIG. 5

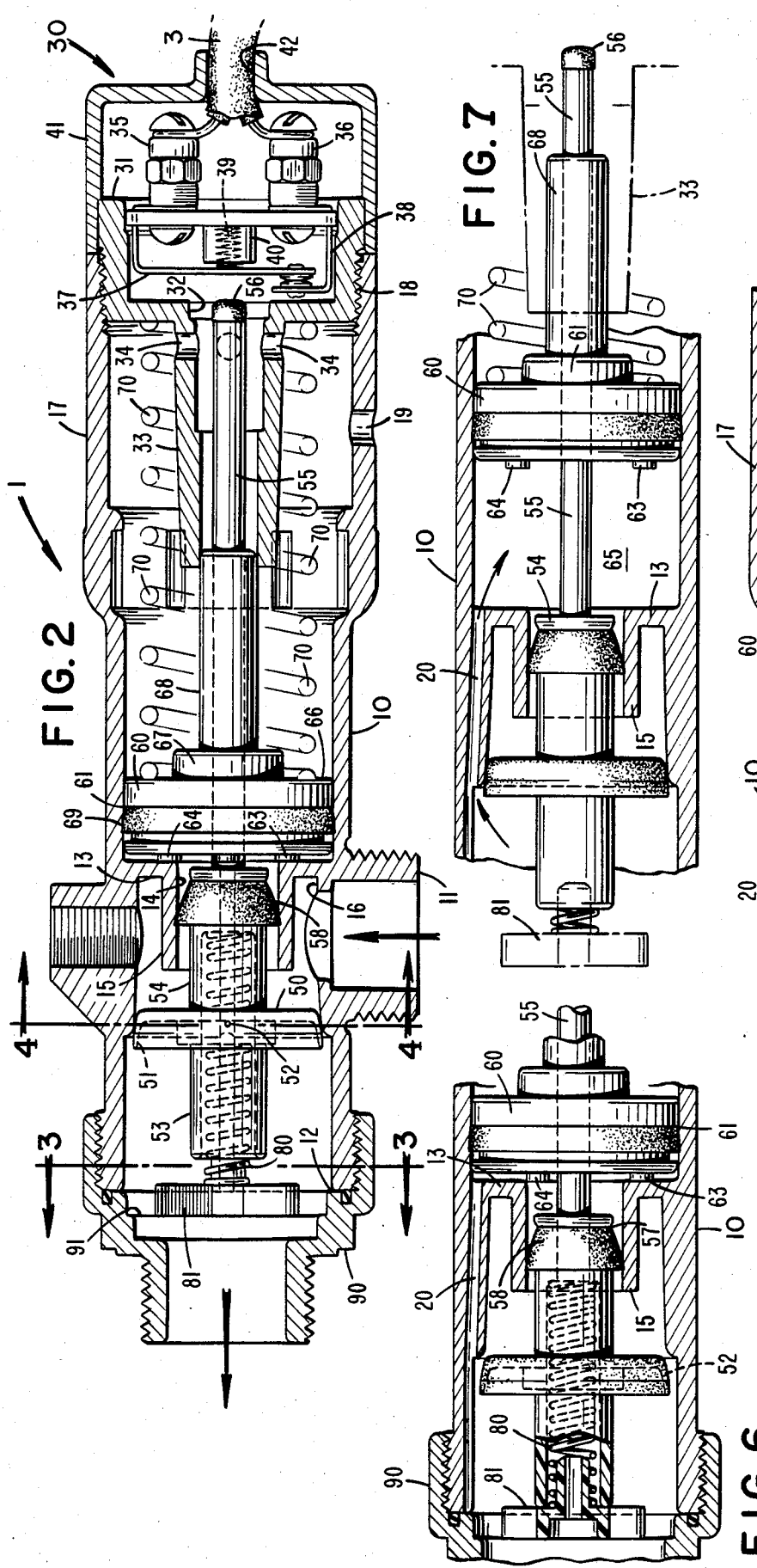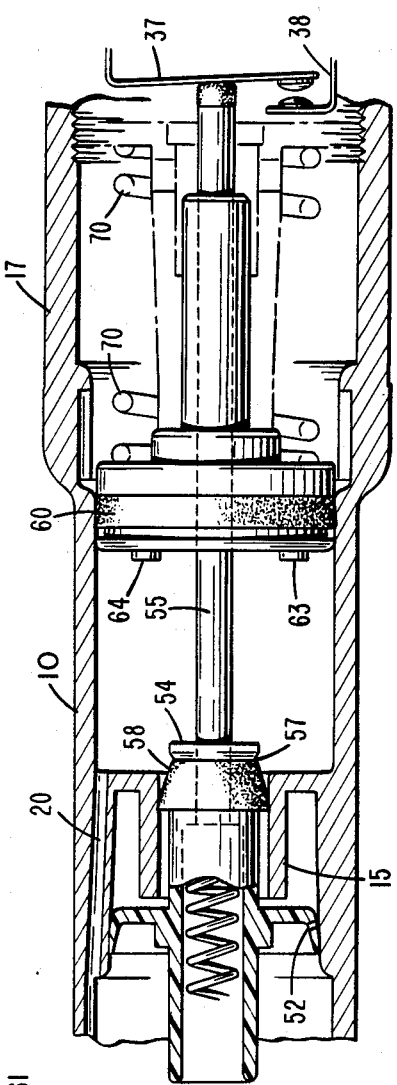

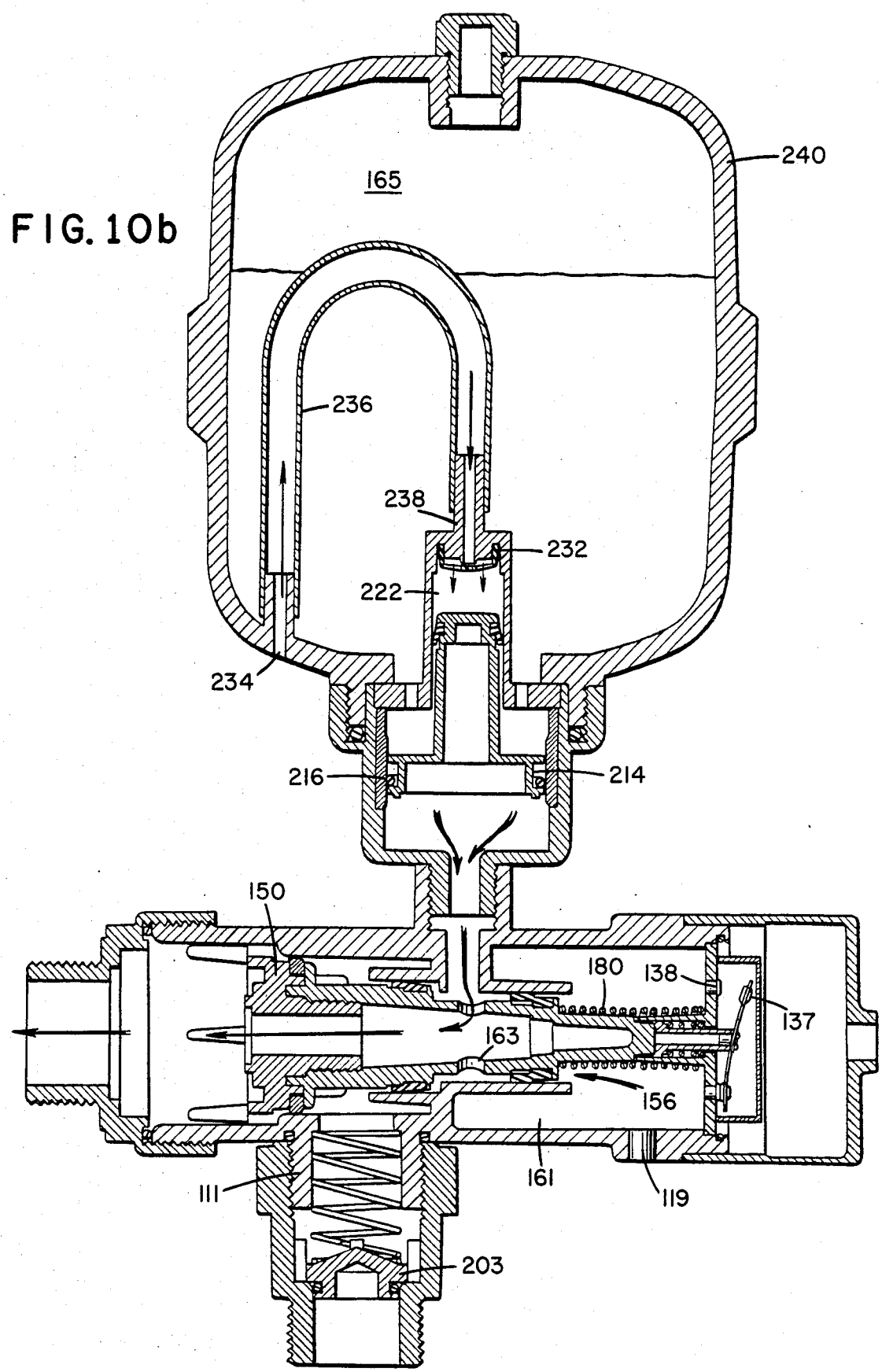

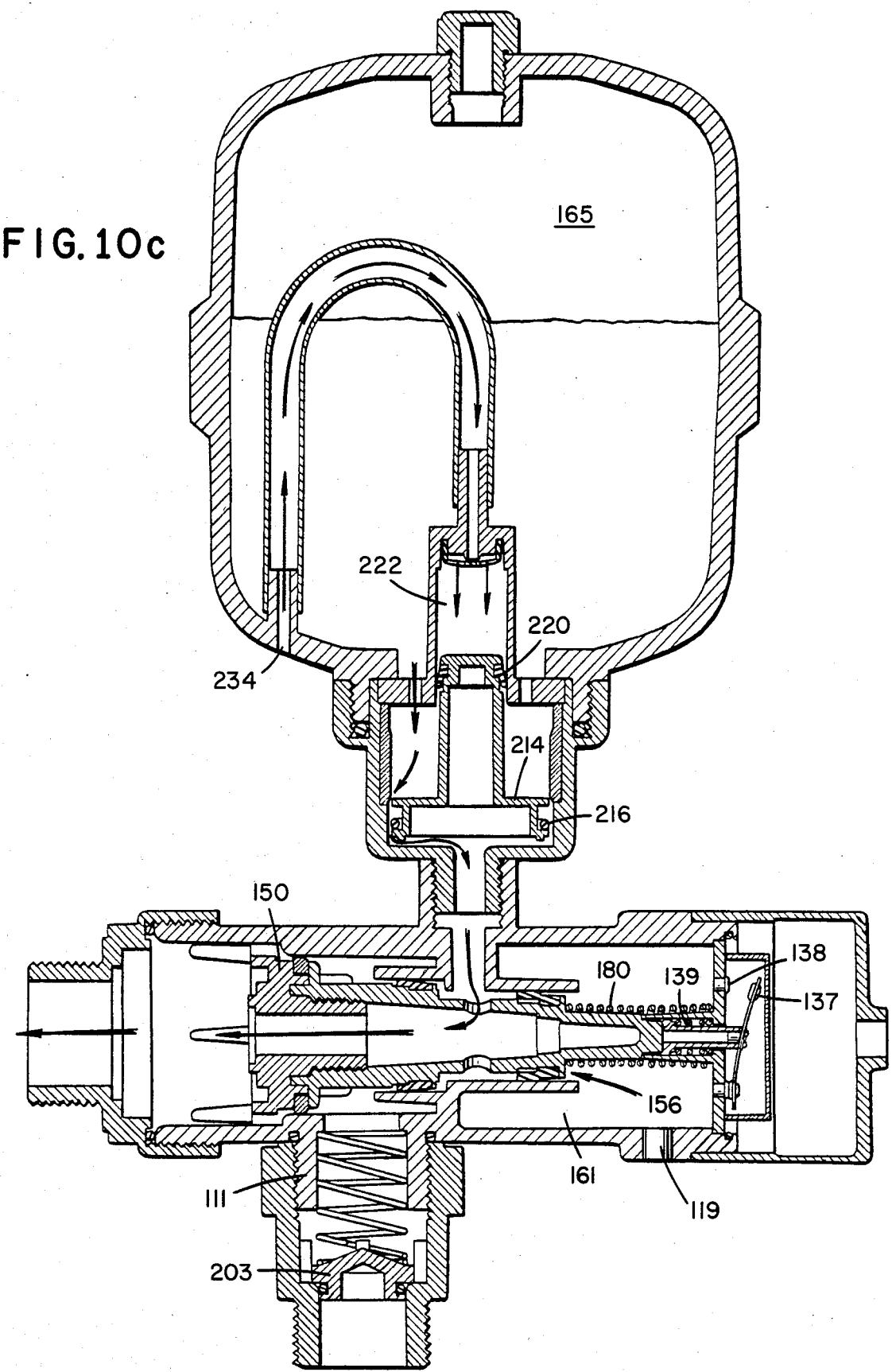

HYDROELECTRIC SWITCH FOR CONTROLLING ELECTRIC MOTOR DRIVEN PUMP

BACKGROUND OF THE INVENTION

The present application is a Continuation-in-Part application of parent application Ser. No. 506,781, now abandoned entitled "A Hydroelectric Switch" filed June 22, 1983 on behalf of Osvaldo J Valdes.

This invention relates to a hydroelectric switch for a pump which replaces conventional hydro-pneumatic tanks having either an air cushion in direct contact with the water or indirect contact with the water through the use of a prepressurized balloon.

When obtaining water from artesian wells or non-pressurized city water mains it has been the custom to pump the water from the well or main to a conventional hydro-pneumatic tank and thereafter utilize the pneumatic pressure to force the water throughout the system.

Such a conventional hydro-pneumatic tank has several disadvantages. One of the main disadvantages is that the pressure in the system during use is not constant due to the loss in pressure from removal of the water from the tank. Another disadvantage of a hydro-pneumatic system wherein the water is in direct contact with the air is the absorption of the air by the water so that the air cushion is eventually eliminated and the pump runs intermittently as a result of even small leaks in the system. Air inlet valves have been introduced into such systems to introduce air into the tank at the same time as water is being introduced into the tank to thereby maintain the air cushion. However, such air inlet valves doe not work satisfactorily for any length of time and require continuous maintenance.

Another disadvantage is that the conventional hydro-pneumatic tanks require so much space due to the reservoir of water and air required. Also to handle the variation in pressure flow a larger pump is required than when handling a constant pressure flow.

SUMMARY OF THE INVENTION

It is therefore an object of this invention to provide a hydroelectric switch for a pump which will permit the flow of water under constant pressure.

Another object is to provide a smaller unit which will provide equal or better service than the conventional hydro-pneumatic tank.

Still another object is to provide a substantially maintenance free hydroelectric switch.

A further object is to provide a hydroelectric switch which can tolerate for a period of time faucet drips and other small leaks without turning on the pump.

A still further object of the present invention is to provide a maintenance free air injection pump for a small hydro-penumatic tank.

The aforesaid objects have been attained by a body containing a disk, a disk seat, the disk reacting to the difference in pressure on different sides of the disk, a compartment which has a variable dimension to allow for slight losses of water to the system without causing the continuous operation of the pump and an electrical switch operable by the disk. The compartment can be comprised of either a spring biased piston operating in a cylinder or a small hydro-pneumatic tank.

BRIEF DESCRIPTION OF THE DRAWINGS

Other details and features of the invention will stand out from the description given below by way of non-limitative example and with reference to the accompanying drawings, in which:

FIG. 1 shows the hydroelectric switch of the invention operationally attached to a fluid pump;

FIG. 2 is an elevational sectional view of the present invention;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 4;

FIG. 6 is a partial sectional view of the present invention taken at an angle of 90° to the sectional view of FIG. 2 showing the disk in a fully open position;

FIG. 7 is a partial sectional view similar to FIG. 6 showing the disk as it seats;

FIG. 8 is a partial sectional view similar to FIG. 6 showing the disk fully seated;

FIGS. 10a-10h are side cross-sectional views of the embodiment of FIG. 9 illustrating the interrelationship of the various parts thereof during operation.

DETAILED DESCRIPTION OF PREFERRED EMBODIMENTS

Figure 9:
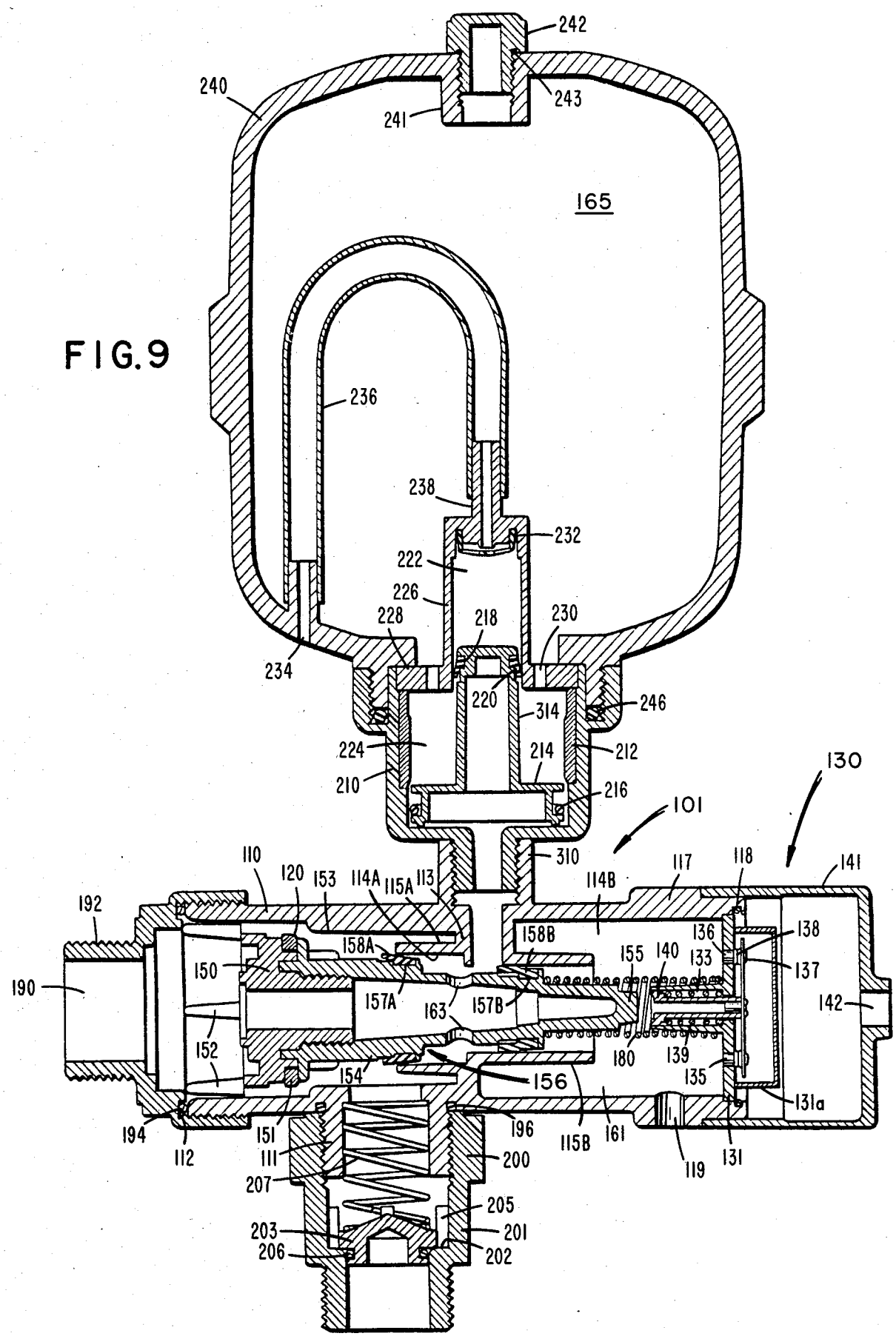
FIG. 9 is a side cross-sectional view of a further embodiment of the present invention in which the compartment is a small hydro-pneumatic tank.

Referring now to the drawings wherein like reference numerals indicate similar elements throughout the several views, FIG. 1 shows the hydroelectric switch 1 threadably attached to pump 2 and connected electrically to pump 2 by cord 3 so that the hydroelectric switch 1 controls the operation of the pump 2. In FIG. 2 there is shown a hollow cylindrical body 10 defining an externally threaded inlet 11 transverse to the longitudinal axis of the body 10, and externally threaded outlet 12 coaxial with the axis of the body 10, a wall 13 defining a central hole 14 therethrough behind the inlet 11, a hollow cylinder 15 extending from wall 13 toward outlet 12, a cylindrical ring 16 extending from the wall 13 toward outlet 12, and an enlarged cylindrical section 17 internally threaded at its end 18. Section 17 has a drain hole 19 therein. A by-pass conduit 20 extends longitudinally through ring 16 and wall 13 to permit fluid pressure equalization. Threadably attached at end 18 is an externally threaded cylindrical electrical switch 30. The switch 30 has a housing 31 with a central hole 32 therein and a hollow cylinder 33 extending axially therefrom toward outlet 12 and integral therewith. The hollow cylinder 33 has holes 34 therein. Attached to the switch housing 31 are electrical terminals 35 and 36 which are connected to cord 3. Connected to terminal 35 is an elongated electrical contact 37. Connected to terminal 36 is an electrical contact 38. Positioned in line with contact 37 is a spring 39 and a spring seat 40. Spring 39 biases electrical contact 37 toward electrical contact 38 to close the circuit and start the pump 2. A cap 41 with a central orifice 42 covers the electrical terminals 35 and 36. Positioned within the body 10 is a disk 50 having a tapered flange 51 with a small pin hole or orifice 52 therein so that the fluid flows tangentially to its axis to prevent clogging, a hollow cylindrical section 53 extending from one side of the disk 50 and a cylindrical section 54 extending from the other side of the disk 50 and from which extends a rod 55 which may be made of metal in which case the end of which has an electrically insulated tip 56. Cylindrical section 54 has a peripheral groove 57 therein in which is seated u-packing 58. The u-packing permits the fluid to flow through hole 14 in only one direction, i.e. right to left in FIGS. 2 and 6-8. Slidably mounted on rod 55 is a piston 60 having a peripheral groove 61, a front face 62 from which extends three pegs, only 63 and 64 of which are shown, which prevent flush contact of face 62 with wall 13 and with wall 13 define a compartment 65 having a variable dimension, a rear face 66 from which extends an orificed base 67 and a hollow cylinder 68. Cylinder 68 is slidable within cylinder 33. Seated within groove 61 is u-packing 69 which prevents fluid from passing behind piston 60. Piston 60 also is fluid sealable around said rod by an internal groove with u-packing therein (not shown). Surrounding base 67 and hollow cylinders 33 and 68 is a spring 70 which biases piston 60 in the direction of wall 13.

Seated within cylinder 53 is one end of a spring 80. Fitting within the other end of spring 80 is a centering element 81. Threadably attached to outlet 12 is an internally threaded adapter 90. The adapter 90 has an internal groove 91 which seats and centers element 81.

Threadably attached to inlet 11 is an internally threaded adapter 100 having a cylindrical section 101 ending in a shoulder 102 which acts as a valve seat for check valve 103. Check valve 103 has guides 105 extending therefrom which permit the valve to move upwardly and downwardly within the cylindrical section 101 without permitting the valve to become unseatable. The vlave also carries an O-ring 106.

With the hydroelectric switch hooked up and the system in a state of rest, fully pressurized, the disk 50 is completely seated, spring 70 is compressed, compartment 65 is filled up completely, and electrical contacts 37, 38 are separated (FIG. 8).

Should a demand occur in the system, piston 60 will move from right to left because of spring 70 and will provide water for the demand until such time as compartment 65 is exhausted of water and piston 60 comes to touch cylindrical section 54, displace rod 55 and thus permit spring 39 to bias contact 37 and establish electrical circuit, starting the pump (FIG. 2).

Higher inlet side pressure unseats disk 51 (FIG. 6), fluid flows around it and out to the system. Should demand diminish, pressure rises, water flows through by-pass conduit 20 into compartment 65 (FIG. 7), forcing piston 60 to the right and compressing spring 70. Rod 55 is now free to move and cause electrical circuit interruption. For this to happen, disk 51 must be fully seated biased by spring 80. For spring 80 to bias disk 51 pressures on both sides of disk 51 must be substantially equalized. If pressure on inlet side of disk 51 is greater than pressure on its outlet side, caused by a fluid demand greater than which orifice 52 is capable of handling, disk 51 will remain unseated, water will still flow around it, and the pump will not stop. If demand is smaller than orifice 52's capacity, pressures on both sides of disk 51 will then be substantially equalized. Disk 51 then will be biased by spring 80, fully seated and the pump will stop. Small leakages in the system flowing through orifice 52 will not cause the pump to run continuously.

The hydroelectric switch may be used to replace 4-6 gallon pressure tanks utilizing pumps pumping from 10-15 gallons per minute. The components of the switch may be made out of metal or plastic such as polyacetal resin CELCON by CELANESE CORPORATION. In some instances, where the volume of compartment 65 is not sufficiently great to prevent frequent intermittent operation of the pump in order to maintain service pressure in view of a number of leaking faucets, it may be desirable to increase the volume of compartment 65 by means of a hydro-pneumatic tank. As noted previously, problems with such tanks are with respect to maintaining a sufficient air cushion in the tank to act in the same manner as the spring biased piston 60 in the previously-discussed hydroelectric switch. Accordingly, FIGS. 9-10h disclose a further embodiment of the present invention wherein similar structures are identified in FIGS. 9-10h by adding 100 to the identification number of the similar structures disclosed in FIGS. 1-8.

FIG. 9 illustrates a further embodiment of hydroelectric switch 1 which is connected to the pump and service outlets in a similar manner to that illustrated in FIG. 1. In FIG. 9, there is shown a hollow cylindrical body 110 defining an externally threaded inlet 111 transverse to the longitudinal axis of body 110, an externally threaded outlet 112 coaxial with the axis of the body 110, an annular wall 113 connected at its periphery to the interior of body 110 and forming a base for hollow cylinder 115a extending from wall 113 toward outlet 112, a second hollow cylinder 115b attached to wall 113 and extending away from outlet 112, and an enlarged cylindrical terminus 117 of body 110. Terminus 117 defines a drain hole 119 located therein. A by-pass gap 120 extends through expandable split ring 151 to permit a low volume fluid flow past ring 151 to permit fluid pressure equalization.

Attached at the end of enlarged cylindrical terminus 117 is a cylindrical electrical switch 130. The switch 130 has a housing 131 with a contact cover 131a located thereon. Housing 131 has a central aperture 132 located therein and a hollow cylinder 133 surrounding said aperture and extending towards said externally threaded outlet 112. Housing 131 is secured within the enlarged cylindrical terminus 117 by means of snap ring 118. Also located on housing 131 are electrical terminals 135 and 136 which are connected to the electrical supply core in the same manner as that disclosed in the first embodiment, the details of which are not illustrated to permit clarity of understanding of the other operating elements.

Electrical terminal 135 is connected to elongated electrical contact 137 and electrical terminal 136 is connected to electrical contact 138. Spring 139 is located within hollow cylinder 133 and external to cylinder 140 where the cylinder 140 is operatively attached at one end to the elongated electrical contact 137. The biasing of cylinder 140 to the left in FIG. 9 by spring 139 insures that contacts 137 and 138 remain closed unless cylinder 140 is biased to the right. Cap 141, having a central orifice 142 therein, is a friction fit on enlarged cylindrical terminus 117 and covers housing 131, 131a and the electrical connections with electrical terminals 135 and 136.

Positioned within body 110 is an annular disk member 150 with guide pins 152 to facilitate axial movement of member 150. Member 150 is threadably received into one end of rod piston 155 having a longitudinal cavity therein and serves to locate the expandable ring 151. The guide pins 152, disk member 150, expandable ring 151 and rod 155 all operate as a valve body member 156. When the valve body member 156 is moved to the right in FIG. 9, expandable ring 151 is a sliding fit within bore 153 of the hollow cylindrical body 110 so as to allow a very limited pressure equalizing flow of water through by-pass gap 120 contained in ring 151 between inlet 111 and outlet 112. Piston rod 155 near its threaded junction with disk 150 has a first peripheral groove 157a with a first u-packing 158a located therein. In the position shown in FIG. 9, fluid flow can pass between u-packing 158a and the interior side 114a of cylinder 115a in both directions. However, when the valve body member 156 is moved to the right, water flow past u-packing 158a is in a direction from right to left only. Piston rod 155 has a second peripheral groove 157b with a second u-packing 158b located therein which seals piston rod 155 against the interior side 114b of the second hollow cylinder 115b. The second u-packing 158b seals the right-hand portion of the valve body member 156 so as to prevent water from flowing into chamber 161 although any water flowing thereinto passes out through drain hole 119. The longitudinal cavity in rod 155 of the valve body member 156 is in communication with the outer portion of the valve body member, between u-packing 158a and u-packing 158b, by means of apertures 163.

Threadably attached to inlet 111 is an internally threaded adapter 200 having a cylindrical section 201 ending in a shoulder 202 which acts as a valve seat for check valve 203. Check valve 203 has guides 205 extending therefrom which permit the valve to move upwardly and downwardly within the cylindrical section 201 without permitting the valve to become unseatable. The valve also carries an O-ring 206 and is biased towards its closed position by spring 207.

Threadably received into a port 310 on the upper portion of the hollow cylindrical body 110 is an air injection pump housing 210 having a cylinder 212 located therein. A hollow piston 214 is movable between a lower position (as shown in FIG. 9) and an upper position (as shown in FIG. 10h). Piston 214 has a cylindrical extension 314. An O-ring seal 216 is provided on piston 214 and sized so as to permit water flow around said piston at both its lowermost position and its uppermost position but to seal the piston to cylinder 212 at a location between the uppermost and the lowermost positions of the piston. It can be seen that this sealing is achieved by the cylinder 212 having a larger bore at the upper and lower ends thereof and a slightly narrowed bore in the portion therebetween.

At an upper end of cylindrical extension 314 there is further included a peripheral groove 218 with u-packing 220 located therein forming a one-way valve permitting air to flow from air chamber 222 into air/water chamber 224. Cylindrical extension 314 slides within cylinder 226. U-packing 220 seals against cylinder 226 preventing fluid flow from chamber 224 into air chamber 222. Cylinder 226 is mounted at one end of the air injection pump housing by disk 228 having apertures 230 located therein. At the other end of cylinder 226 there is a one-way valve 232 permitting air to flow from external port 234 through connecting tube 236 and fitting 238 into chamber 222 when the pressure in chamber 222 is lower than external or atmospheric pressure.

External port 234 is located in hydro-pneumatic tank 240 which encloses compartment 165. An upper portion of tank 240 includes a fitting 241 with an air bleed bolt 242 threadably received therein. O-ring seal 243 is compressed between tank 240 and air bleed bolt 242 sealing the threadable aperture when the air bleed bolt is tightened. Tank 240 is threadably received into the air injection pump housing 210 and sealed by O-ring seal 246.

Threadably attached to outlet 112 of hollow cylindrical body 110 is an internally threaded adapter 190. Adapter 190 includes an externally threaded portion 192 which is connectable to the water system which is being supplied by the pump in FIG. 1. Adapter 190 compresses O-ring 194 between the adapter and the outlet end portion of the hollow cylindrical body to seal the adapter thereto. Similarly, adapter 200 compresses O-ring seal 196 against the hollow cylindrical body 110 when it is threadably received onto outlet 111.

Figure 10A:
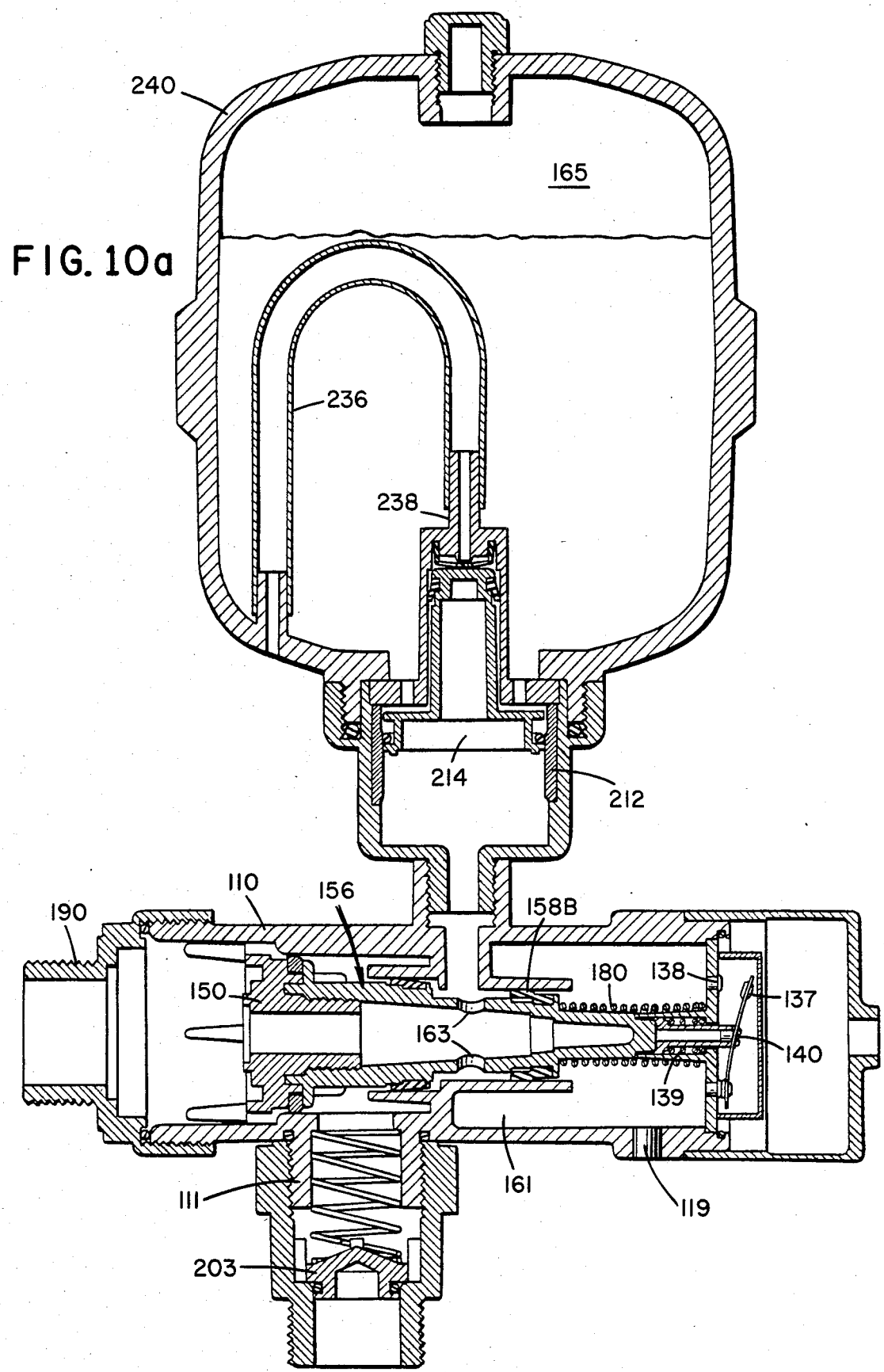

With the hydroelectric switch hooked up and the system in a state of rest, fully pressurized, the valve member 156 is in the position shown in FIG. 10a. Tank 240 is filled to the level as shown and piston 214 is in its uppermost position. Valve member 156 is biased towards the right in FIG. 10a by the pressure of water pushing against piston rod 155 sealed by the second u-packing 158b in the second hollow cylinder 115b. Because chamber 161 is open to the atmosphere through drain hole 119, the pressure to the right of the u-packing 158b is substantially less than the water pressure to the left of u-packing 158b and thus overcomes the bias of spring 180 to theleft thereby forcing piston rod 155 to the right. The water pressure versus ambient air pressure differential is sufficiently great to force the end of rod 55 into contact with cylinder 140 causing it to compress spring 139 and bias elongated electrical contact 137 out of electrical contact with electrical contact 138. Thus, with the system in a state of rest and zero demand for water, fully pressurized, the electrical contacts are opened as indicated in 10a.

In the case of a partial demand (water leaking from a faulty water system connection or leaky faucet) water flow will be from below piston 214 through holes 163 and annular disk 150 as a result of air pressure in tank 240 forcing piston 214 downwardly. This lower pressure on the lower portion of piston 214 and the higher pressure on the upper portion of the piston (from the pressurized compartment 165) will force O-ring seal 216 to seat against the narrowed portion of cylinder 212 and further water drainage will force piston 214 to begin moving downwards as illustrated in FIG. 10b.

As the piston is moved downward, a vacuum is formed in chamber 222 into which atmospheric air flows through external port 234, connecting tube 236, fitting 238 and past one-way valve 232. The piston continues moving downward until it reaches its lowermost postion as shown in FIG. 10c. At this point, because the O-ring seal 216 is in a state of a loose fit, water will travel directly from the tank around the O-ring seal surrounding piston 214 and into the interior of rod 155 and through annular disk 150 to the outlet thereof. Because the pressure of water in the system is still sufficiently large to overcome the bias of springs 180 and 139, electrical contacts 137 and 138 remain open and the pump remains in its deactivated state. Because u-packing 220 has reached its lowermost position, chamber 222 is full of air at atmospheric pressure and no additional air travels into the chamber by means of external port 234.

Figure 10D:
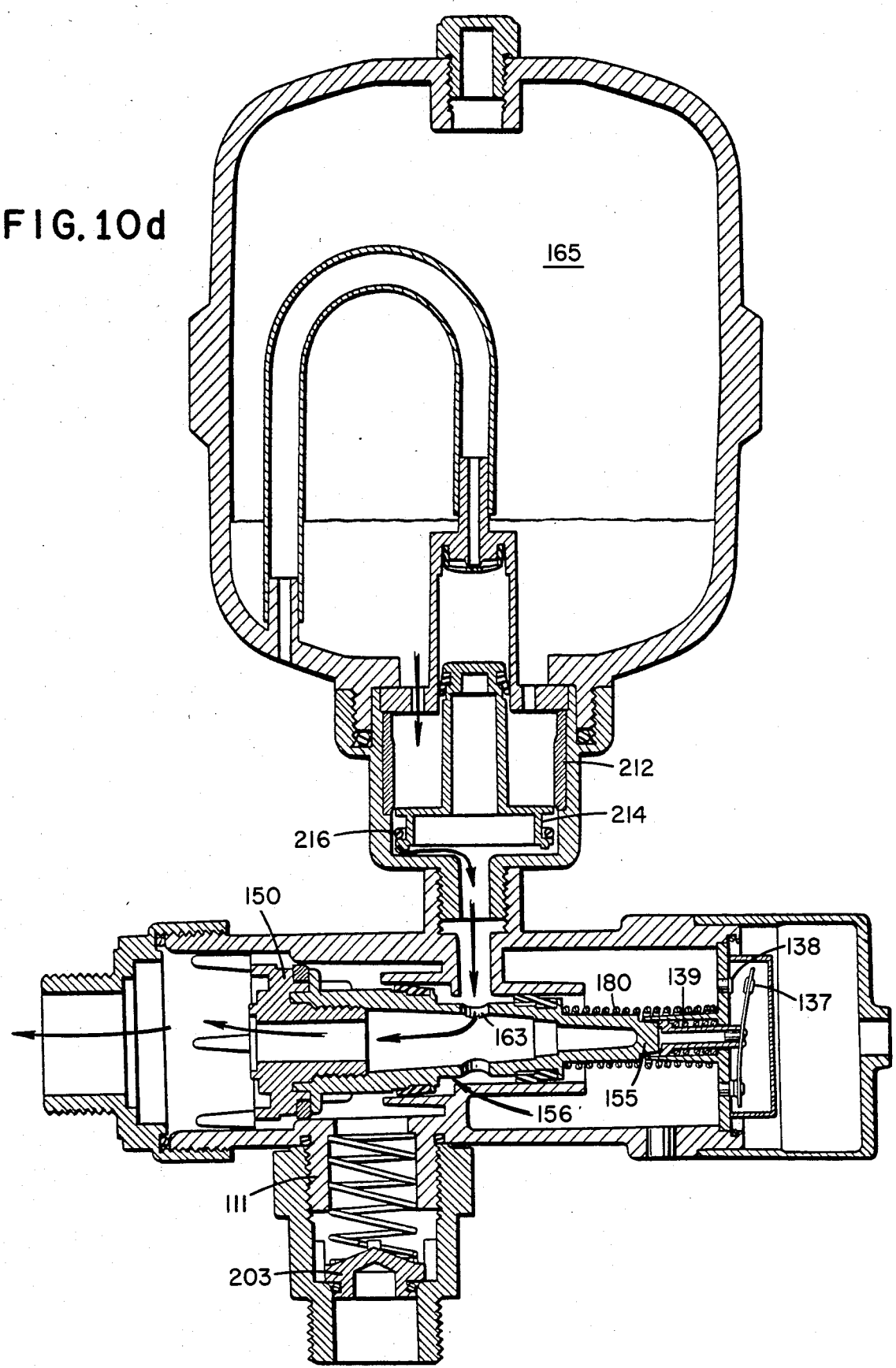

As the water level in compartment 165 continues to decrease (under the pressure of compressed air cushion thereabove) the water pressure begins to drop and thus springs 180 and 139 begin to overcome the pressure of the water in the system on piston rod 155 thereby forcing valve body member 156 to begin moving to the left permitting elongated electrical contact 137 to approach a closed or electrical contacting relationship with electrical contact 138 as shown in FIG. 10d.

It should be noted that the water flow rate during the partial demand previously discussed is not sufficiently great so as to provide a pressure differential across disk 150 so as to force the valve body member 156 immediately to the left allowing the electrical contacts to close and beginning pump operation. However, should one or more faucets be turned on in the main water system, the sudden drop in pressure to the left of disk 150 will cause the valve body member 156 to move to the left immediately closing the electrical contacts and starting the pump operation regardless of the water level in compartment 165. Thus, beginning with FIG. 10e the operation of the hydraulic switch is the same with respect to either full demand at any water level in compartment 165 or with partial demand at the low water level (and hence low air pressure).

Figure 10E:
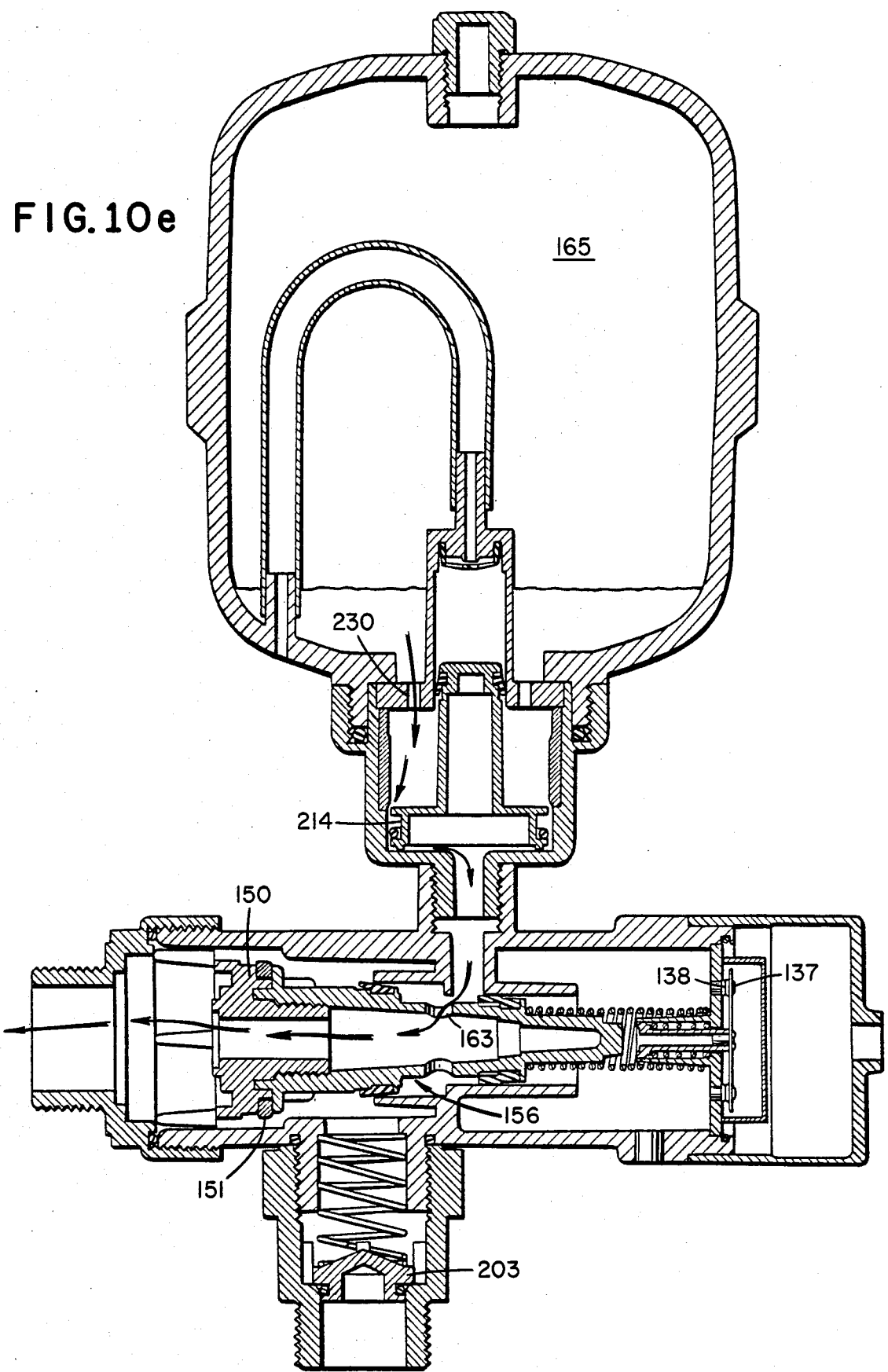

Referring now to FIG. 10e, the electrical contact 137 has just contacted electrical contact 138 and water is still being supplied by compartment 165 and the electric pump has just begun operation.

Figure 10F:
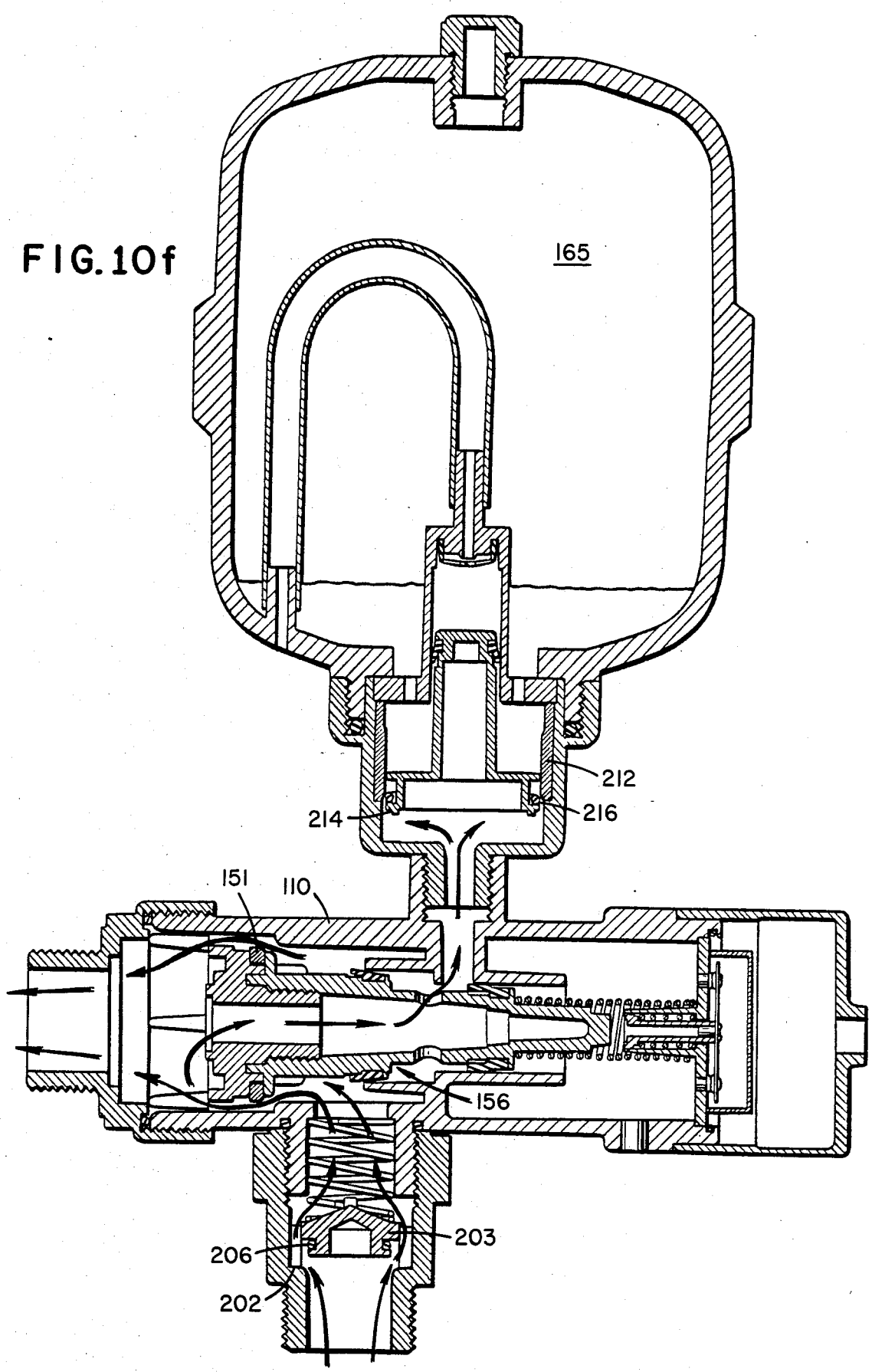

In FIG. 10f, the pump has begun supplying water under sufficient pressure to raise check valve 203 and O-ring 206 out of a sealing relationship with shoulder 202, permitting water under substantial pressure to flow into the hollow cylindrical body 110. The water under pressure travels past valve member 156 and expandable ring 151 as shownand either into the system or through disk 150, piston rod 155, holes 163 to piston 214. The kinetic energy of water travelling up towards the piston forces the piston to rise slightly such that O-ring seals 216 comes into a sealing contact with the bore of cylinder 212.

Figure 10G:
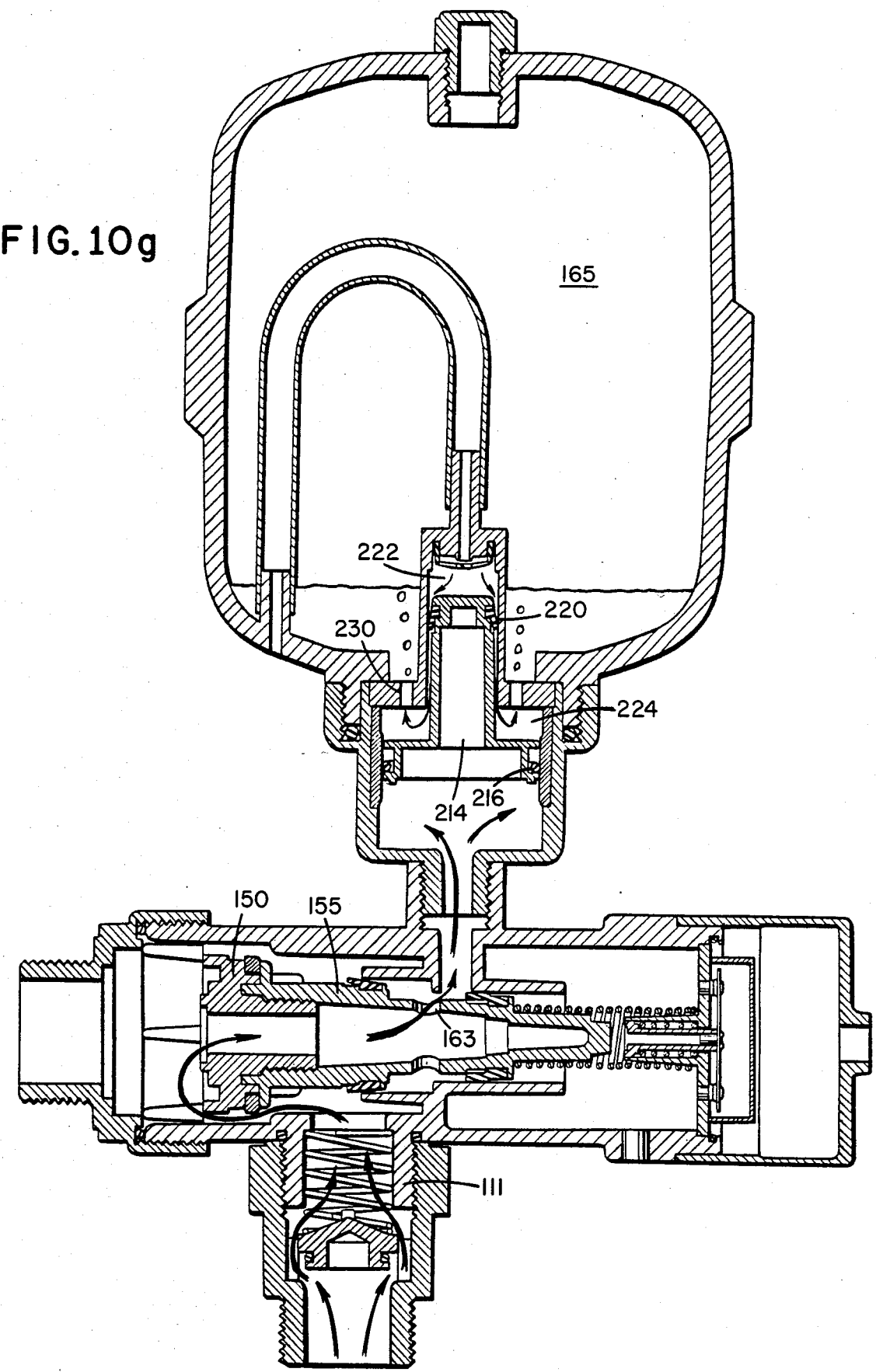
Figure 10H:
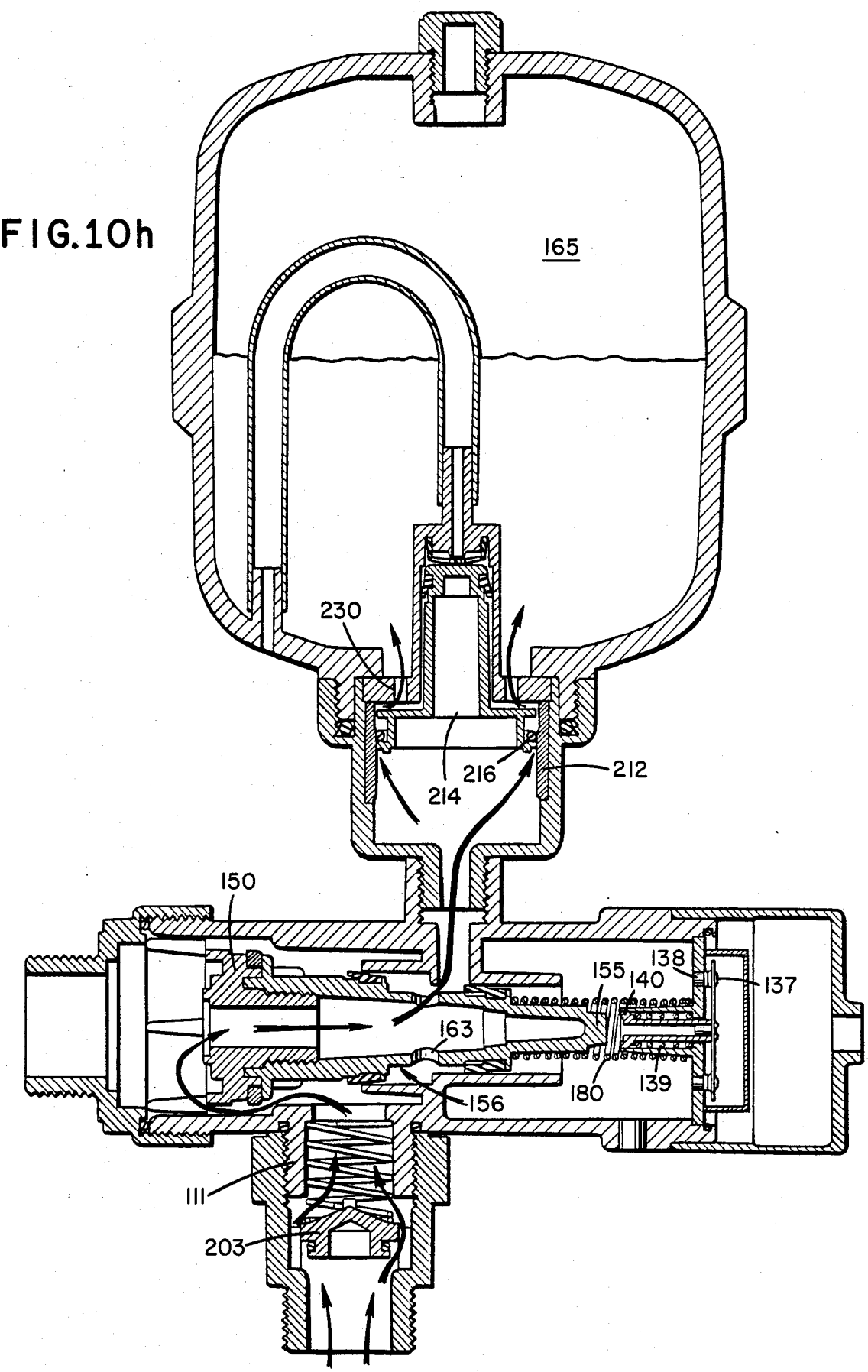

Depending upon the water pressures involved, the piston may travel partially upwards or may just sit in an intermediate position with O-ring seal 216 sealed to cylinder 212. Once the water demand has stopped and the pressure at the outlet end of the hollow cylindrical body begins to increase (due to the continued pumping of water under pressure into the internal portion of the hollow cylindrical body), the piston 214 will begin moving upwardly as shown in FIG. 10g. The volume of chamber 222 will begin getting smaller and when the air contained therein is compressed to a pressure equal to that contained in compartment 165, air will begin to flow past u-packing 220 into chamber 224 and from there through apertures 230 into compartment 165.

The flow of air into compartment 165 will continue until piston 214 reaches its uppermost position as shown in FIG. 10h. O-ring seal 216 is no longer in a sealing relationship with cylinder 212 permitting water under pressure to flow therearound and through apertures 230 refilling compartment 165. Valve body member 156 remains under the bias of spring 180 in its left-most position which permits a flow of water from the threaded inlet 111 through disk 150, piston rod 155 and apertures 163, around piston 214, through aperture 230 into compartment 165. When the air pressure in tank 240 equals or substantially equals the pressure required to overcome the bias of springs 180 and 139, piston rod 155 moves to the right to force cylinder 140 to again open contacts 137 and 138 and the condition illustrated in FIG. 10a is again reached.

As with the previously discussed hydroelectric switch, the large compartment hydroelectric switch may be used to replace four to six gallon pressure tanks utilizing pumps pumping from 10 to 15 gallons per minute. The components of this switch as well may be made from metal or plastic such as polyacetal resin CELCON by CELANESE CORPORATION.

What is claimed is:

1. A hydroelectric switch for controlling operation of an electric motor-driven pump based upon a zero, partial or full demand for water in a water system, said hydroelectric switch comprises:
   a hollow sylindrical body having an internal bore, a water inlet from the pump, a water system outlet and an air injection pump connection;
   a hydro-pneumatic compartment;
   an air injection pump means, connecting said hydro-pneumatic compartment to said air injection pump connection, for injecting air into said compartment upon operation of said motor-driven pump;
   a hollow valve body member means, disposed in said hollow cylindrical body bore, for limited axial movement therein in response to zero, partial or full demand for water in said system, said hollow valve body member means including a piston rod, having two sides and being sealably mounted in said bore, with variable system water pressure on one side of said piston rod and a relatively constant pressure on the other side of said piston rod and defining holes therein on the variable system water pressure side of said piston rod to communicate the air injection pump means and hydro-pneumatic compartment with said water system outlet;
   electrical contact means for completing an electric circuit to operate said electric motor-driven pump when said valve body member means is not in contact with said contact means; and
   means for biasing said valve body member away from said contact means, said biasing means bias being sufficient to overcome water pressure on said piston rod when said hydro-pneumatic chamber reaches a lower level under partial demand or when there is full demand for water by said water system, but said bias being insufficient to overcome the water pressure on said piston rod when said hydro-pneumatic chamber is full and there is zero demand for water by said water system.

2. The hydroelectric switch in accordance with claim 1, wherein said electrical contact means is located at one end of said hollow cylindrical body and said water system outlet is located concentrically with said internal bore at an opposite end of said hollow cylindrical body from said electrical contact means.

3. A hydroelectric switch in accordance with claim 1, wherein said biasing means is at least one spring urging said valve body member means away from said contact means and toward said water system outlet.

4. A hydroelectric switch in accordance with claim 1, wherein said valve body means piston rod includes a peripheral groove therearound and has seated in said groove an U-packing so as to seal the piston rod in its movement in said cylinder from fluid passing thereby.

* * * * *